United States Patent
Abdollahi

(10) Patent No.: US 10,720,854 B2
(45) Date of Patent: Jul. 21, 2020

(54) 72-PULSE AC-DC CONVERTER FOR POWER QUALITY IMPROVEMENT

(71) Applicant: Rohollah Abdollahi, Qom (IR)

(72) Inventor: Rohollah Abdollahi, Qom (IR)

( * ) Notice: Subject to any disclaimer, the term of this patent is extended or adjusted under 35 U.S.C. 154(b) by 0 days.

(21) Appl. No.: 15/224,697

(22) Filed: Aug. 1, 2016

(65) Prior Publication Data
US 2020/0052574 A1   Feb. 13, 2020

(51) Int. Cl.
| | | |
|---|---|---|
| *H02M 7/08* | (2006.01) | |
| *H02M 1/12* | (2006.01) | |
| *H02M 1/42* | (2007.01) | |
| *H02M 7/04* | (2006.01) | |
| *H01F 30/14* | (2006.01) | |
| *H01F 30/02* | (2006.01) | |

(52) U.S. Cl.
CPC .............. *H02M 7/08* (2013.01); *H01F 30/02* (2013.01); *H01F 30/14* (2013.01); *H02M 1/12* (2013.01); *H02M 1/4233* (2013.01); *H02M 7/043* (2013.01); *H02M 2001/4283* (2013.01)

(58) Field of Classification Search
CPC ........ H02M 1/12; H02M 1/4233; H02M 7/08; H02M 7/043; H02M 2001/4283; H01F 30/02; H01F 30/14
See application file for complete search history.

(56) References Cited

U.S. PATENT DOCUMENTS

| | | | |
|---|---|---|---|
| 5,343,080 A | 8/1994 | Kammeter | |
| 5,619,407 A | 4/1997 | Hammon | |
| 6,198,647 B1 | 3/2001 | Zhou et al. | |
| 6,249,443 B1 | 6/2001 | Zhou et al. | |
| 6,335,872 B1 | 1/2002 | Zhou et al. | |
| 6,982,884 B1* | 1/2006 | Paice | ....................... H01F 30/02 363/126 |
| 7,233,506 B1* | 6/2007 | Paice | .................... H02M 7/043 363/129 |
| 7,274,280 B1 | 9/2007 | Paice | |
| 7,375,996 B2 | 5/2008 | Singh et al. | |
| 7,719,858 B1 | 5/2010 | Paice | |
| 8,737,097 B1* | 5/2014 | Swamy | ................. H02M 5/458 363/67 |
| 8,982,595 B2 | 3/2015 | Abdollahi | |
| 2002/0186112 A1* | 12/2002 | Kamath | ................... H01F 30/02 336/5 |

(Continued)

*Primary Examiner* — Alex Torres-Rivera
(74) *Attorney, Agent, or Firm* — Azadeh Saidi

(57) ABSTRACT

A novel 72-pulse AC-DC converter based on a 36-pulse converter is designed and implemented in this invention. Combining the outputs of two parallel 18-pulse diode bridges, consisting of nine legs of diode rectifiers, results in a 36-pulse topology. A zero sequence blocking transformer (ZSBT) is designed and applied to the proposed scheme guarantying the independent operation of the two bridges. To achieve a 72-pulse output, a pulse doubling circuit is applied which is inherently a tapped inter-phase transformer. A polygon-connected autotransformer platform is designed and added to the converter, making the proposed scheme suitable for retrofit applications. The proposed solution is a tradeoff among the pulse number, the transformer platform, the complexity of the scheme and the cost. The proposed scheme has an optimized configuration in this regard. The simulation results show that the proposed scheme improves the power quality indices.

7 Claims, 13 Drawing Sheets

(56) References Cited

U.S. PATENT DOCUMENTS

Figure 1:
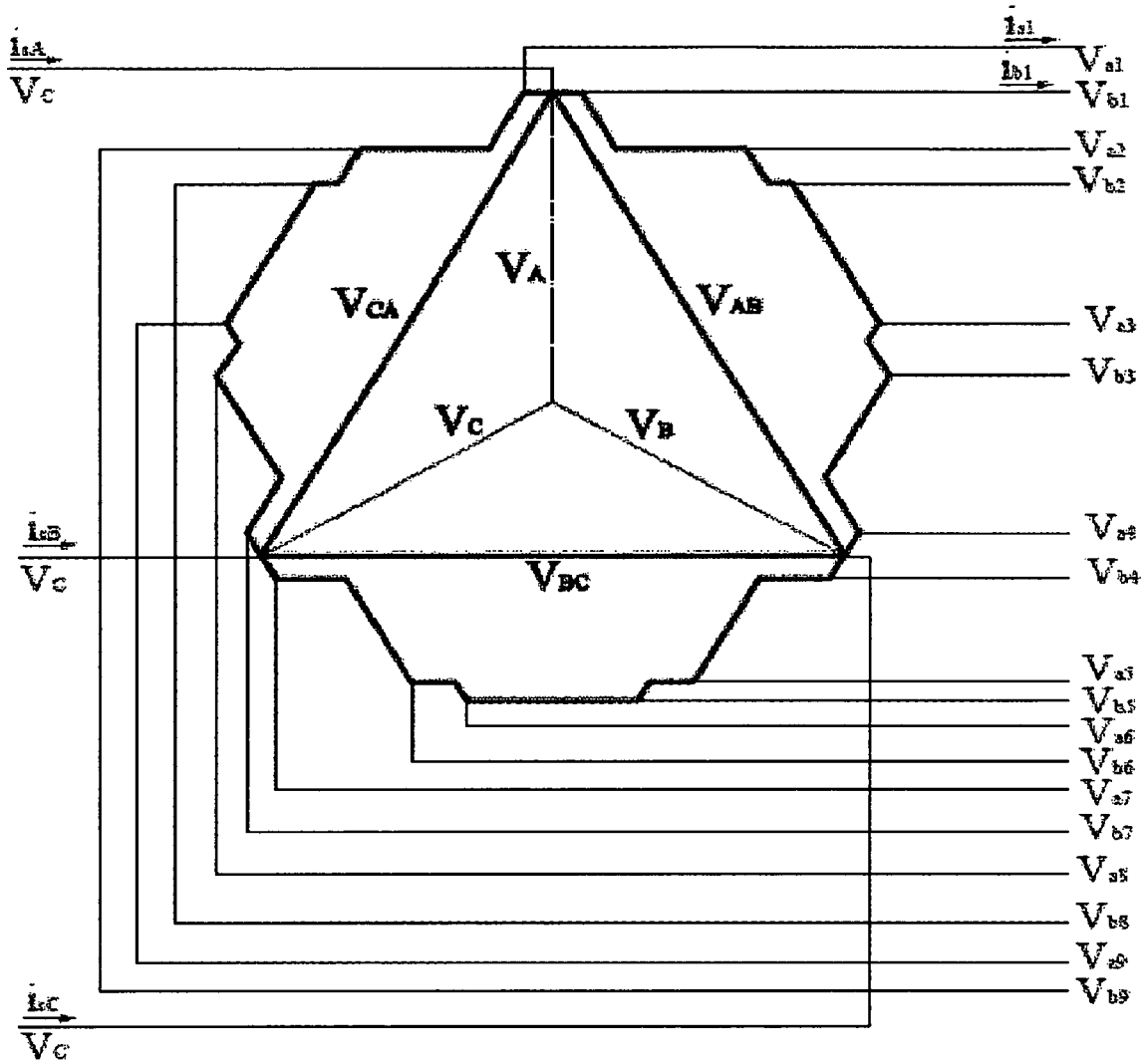

| | | | | |
|---|---|---|---|---|
| 2002/0190697 A1* | 12/2002 | Ferens | ............... | H02J 3/1878 |
| | | | | 323/215 |
| 2005/0035838 A1* | 2/2005 | Owen | ............... | H01F 30/02 |
| | | | | 336/5 |
| 2009/0251932 A1* | 10/2009 | Owen | ............... | H02M 1/126 |
| | | | | 363/44 |
| 2010/0073970 A1* | 3/2010 | Abolhassani | ............... | H01F 30/12 |
| | | | | 363/37 |
| 2014/0218982 A1* | 8/2014 | Abdollahi | ............... | H02M 7/08 |
| | | | | 363/64 |

* cited by examiner

72-PULSE AC-DC CONVERTER FOR POWER QUALITY IMPROVEMENT

FIELD OF THE INVENTION

The present invention relates to the design of a polygon-connected autotransformer based 72-pulse ac-dc converter, which can be used for harmonic reduction in different applications such as adjustable speed AC or DC motor drives.

BACKGROUND OF THE INVENTION

As a practical technique, vector-controlled (VC) strategy is implemented in induction motor drives (VCIMDs), serving various applications. These drives utilize voltage source inverters which are fed from conventional six-pulse diode bridge rectifiers. The most important drawback of these rectifiers is their poor power quality, i.e. current harmonics injection into ac grid. The circulation of current harmonics into the source impedance yields in voltage harmonics at the point of common coupling (PCC) and consequently undesired supply voltage conditions for nearby costumers.

The value of current harmonic components, which are injected into the grid by nonlinear loads, should be controlled within the standard limits. The most prominent standards in this field are IEEE standard 519 and the International Electro-technical Commission (IEC) standard.

For VCIMDs, one effective solution to eliminate harmonics is the application of the multi-pulse AC-DC converters. According to the recent investigations, these converters are based on either phase multiplication, phase shifting, pulse doubling or a combined solution (have been reported in U.S. patents such as U.S. Pat. No. 7,274,280, etc). Application of multi-pulse technique (up to 18-pulse) in AC-DC converters are reported in U.S. Pat. No. 7,375,996 where line current THD of more than 5% is experienced under different load conditions.

The polygon-connected autotransformer based 30-pulse (U.S. Pat. No. 7,719,858) was designed for AC-DC power converter. The DC link voltage in this topology is higher than that of a 6-pulse diode bridge rectifier, thus making the scheme non-applicable for retrofit applications.

The T-connected autotransformer based 40-pulse converter has been designed in (U.S. Pat. No. 8,982,595) for direct torque controlled induction motor drive (DTCIMD) with a current THD between 2.55% to 3.79% from full-load to light-load (20% of full-load), respectively. In some applications, it is necessary to take strict power quality measures; therefore, it would be essential to apply the converters with higher number of pulses. For instance, in some applications, harmonics are distinguished as signatures by sonar, and unintentionally are capacitively coupled to ship hull resulting in induced hull currents that make the systems such as degaussing equipment malfunction. In this situation, the operation of harmonic generating loads should be limited, in order to have a THD equal or less than 3%.

BRIEF DESCRIPTION OF THE ACCOMPANYING DRAWINGS

FIG. 1; proposes an autotransformer winding arrangement, polygon connection.

Figure 2A:
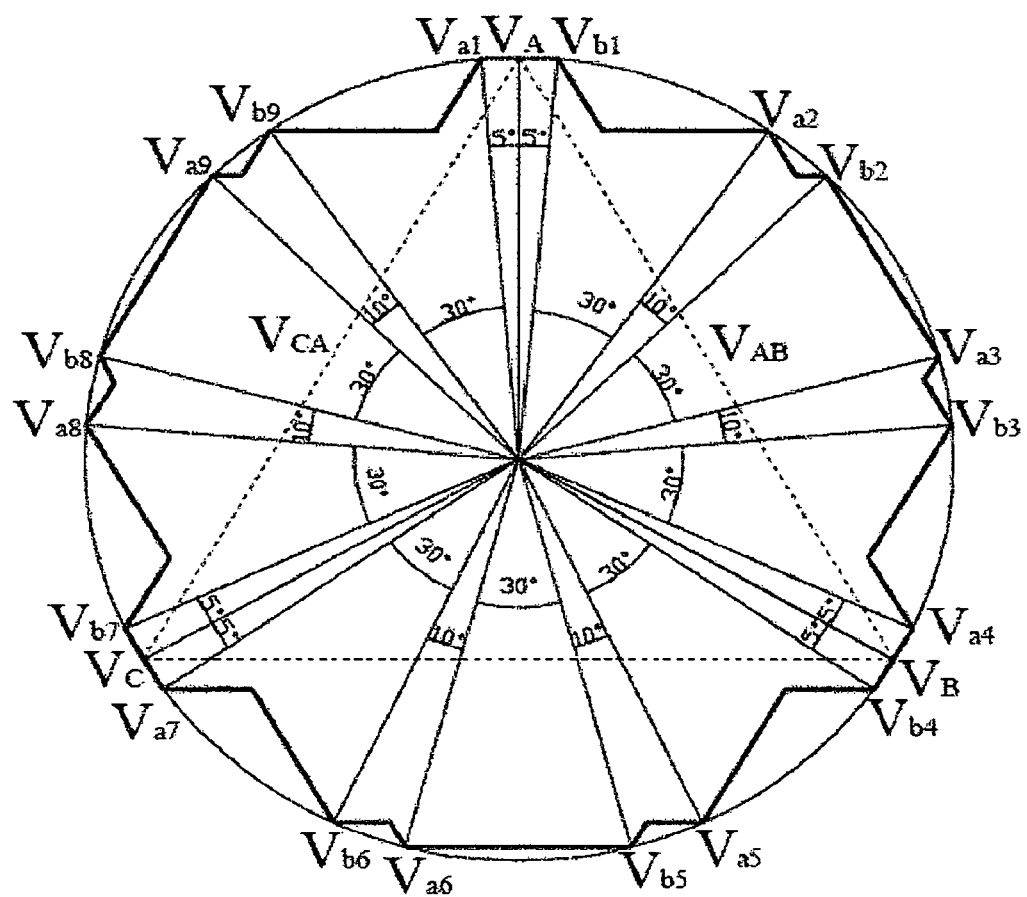
Figure 2B:
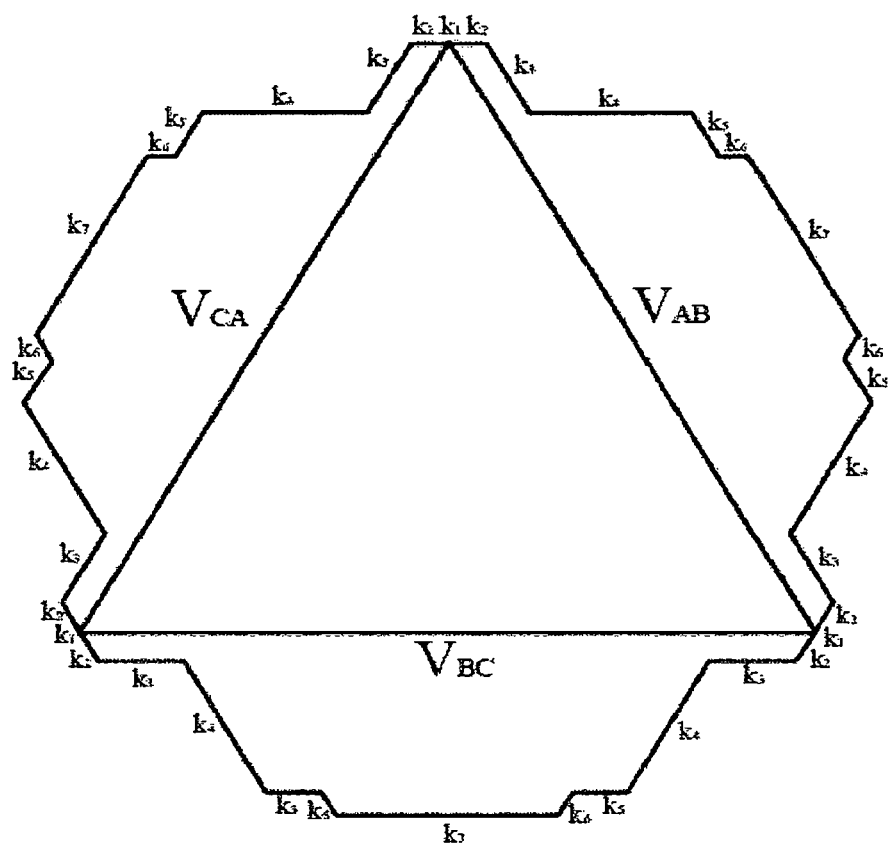

FIGS. 2a, 2b; display a polygon connection of proposed autotransformer for 36-pulse converter and its phasor representation.

Figure 3:
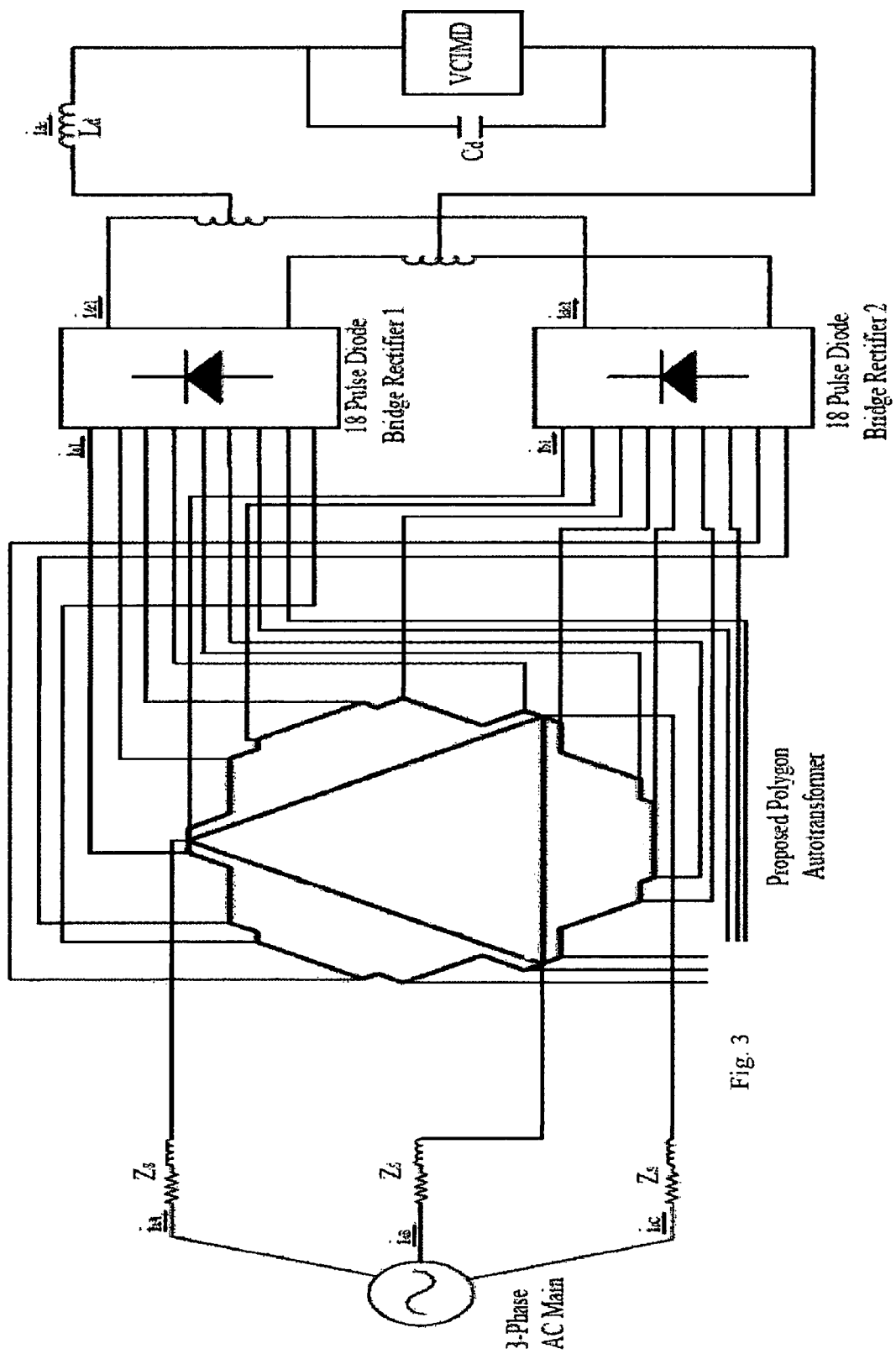

FIG. 3; displays a polygon-autotransformer configuration for 36-pulse ac-dc conversion.

Figure 4:
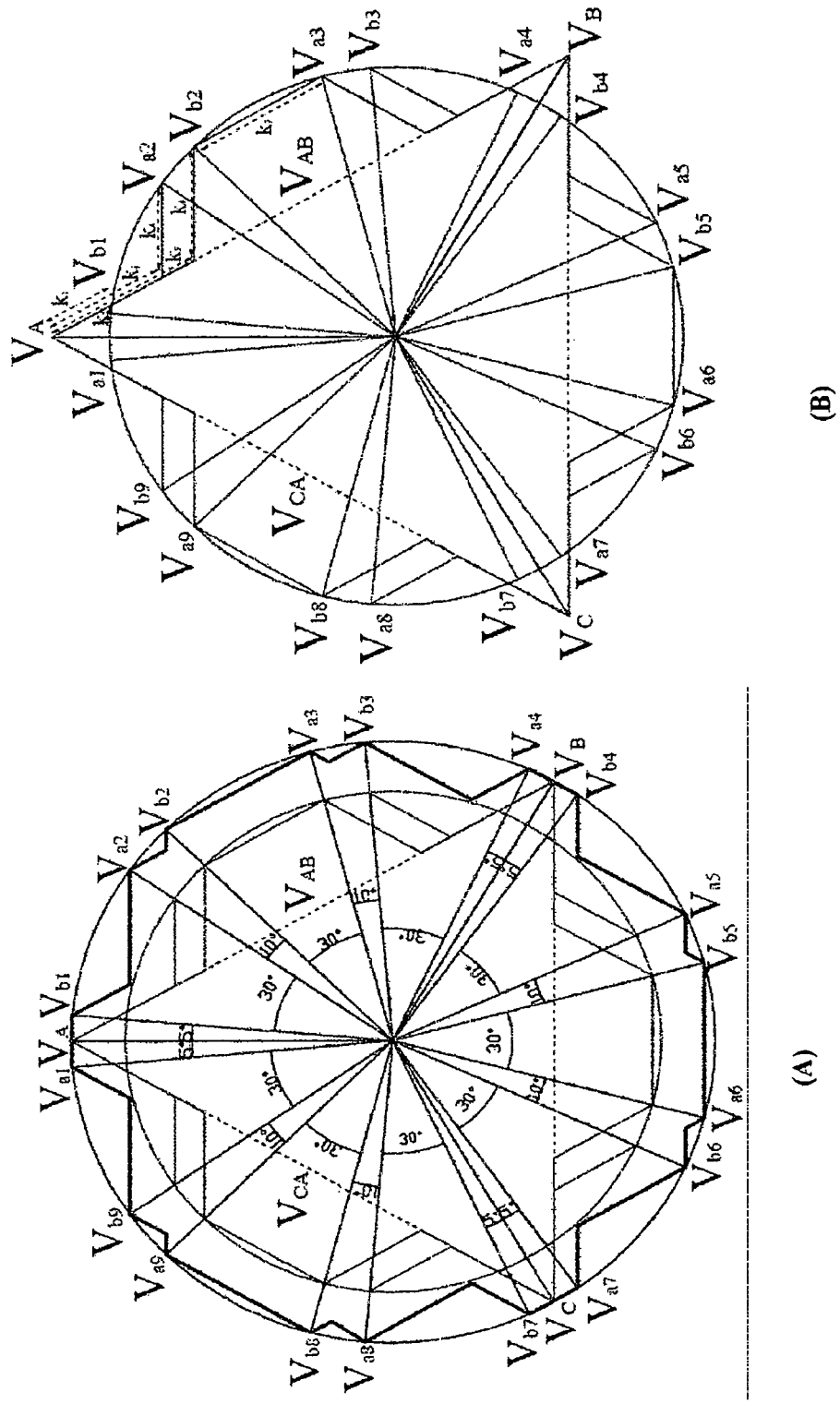

FIG. 4; displays a phasor diagram of voltages in proposed autotransformer connection (A) along with modifications for retrofit arrangement (B).

Figure 5:
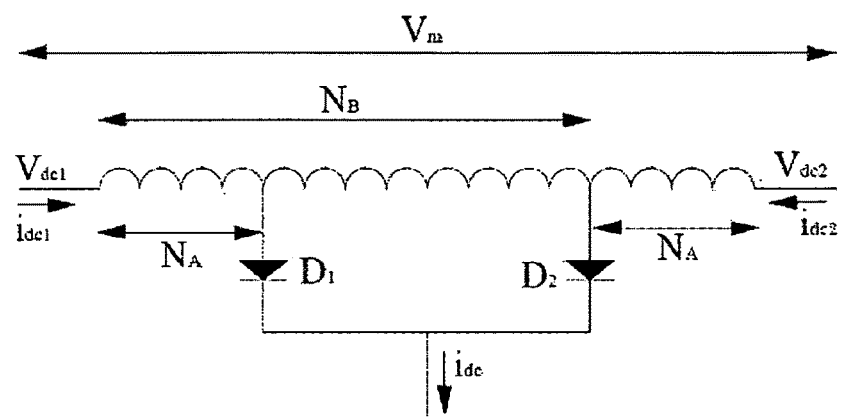

FIG. 5; displays a tapped IPT circuit for pulse-doubling in 36-pulse converters.

Figure 6:
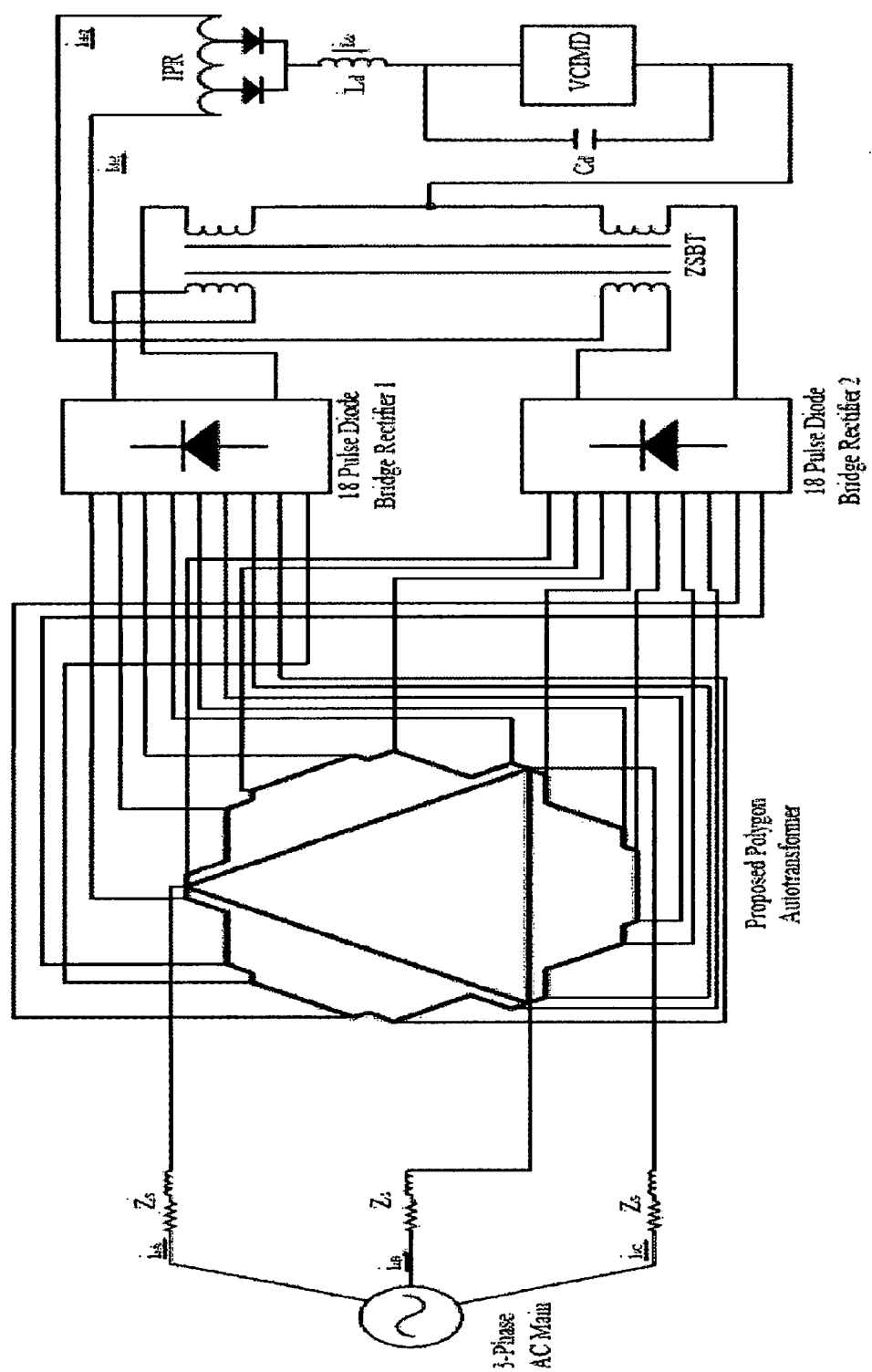

FIG. 6; displays a polygon transformer configuration for 72-pulse ac-dc conversion.

Figure 7:
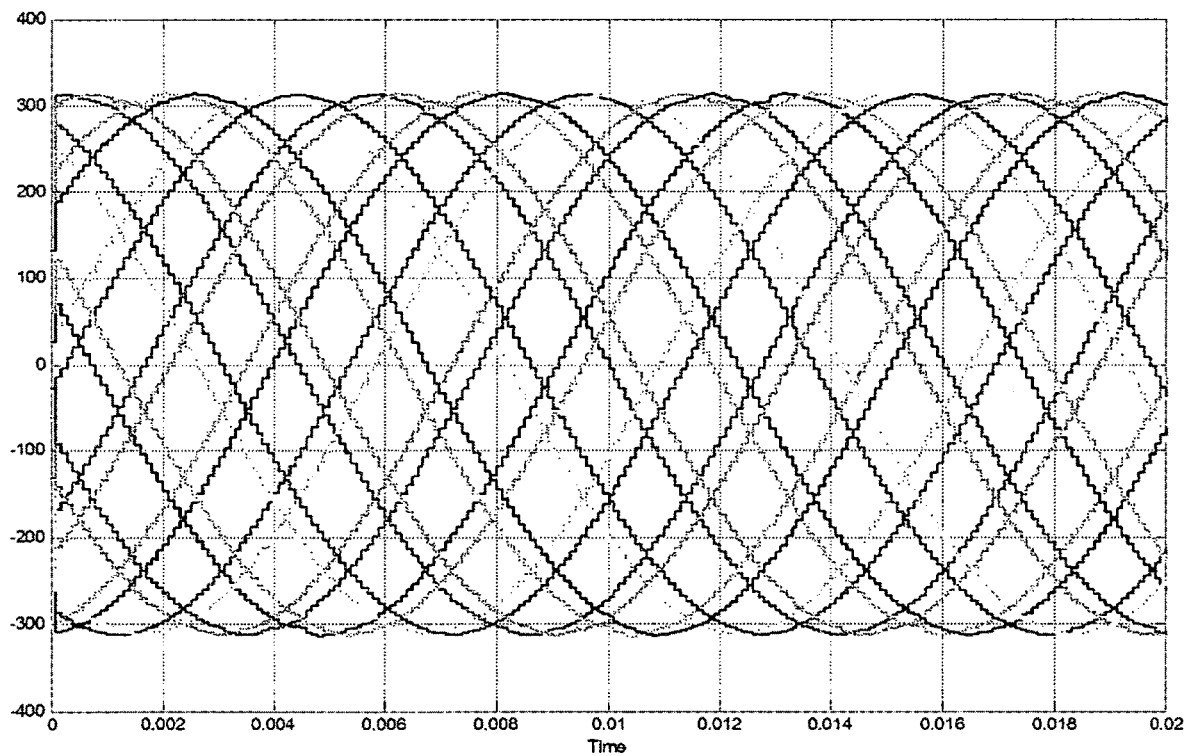

FIG. 7; displays eighteen-phase autotransformer output voltage waveforms.

Figure 8:
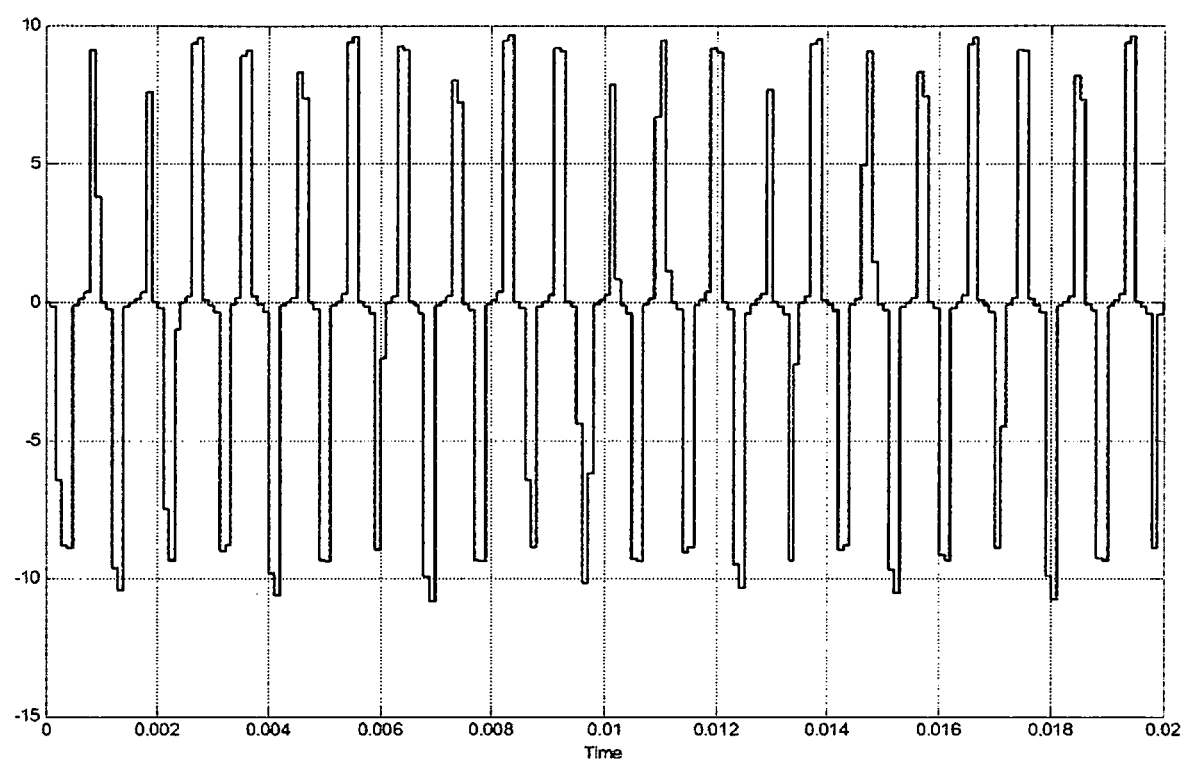

FIG. 8; displays a voltage waveform across tapped IPT.

Figure 9:
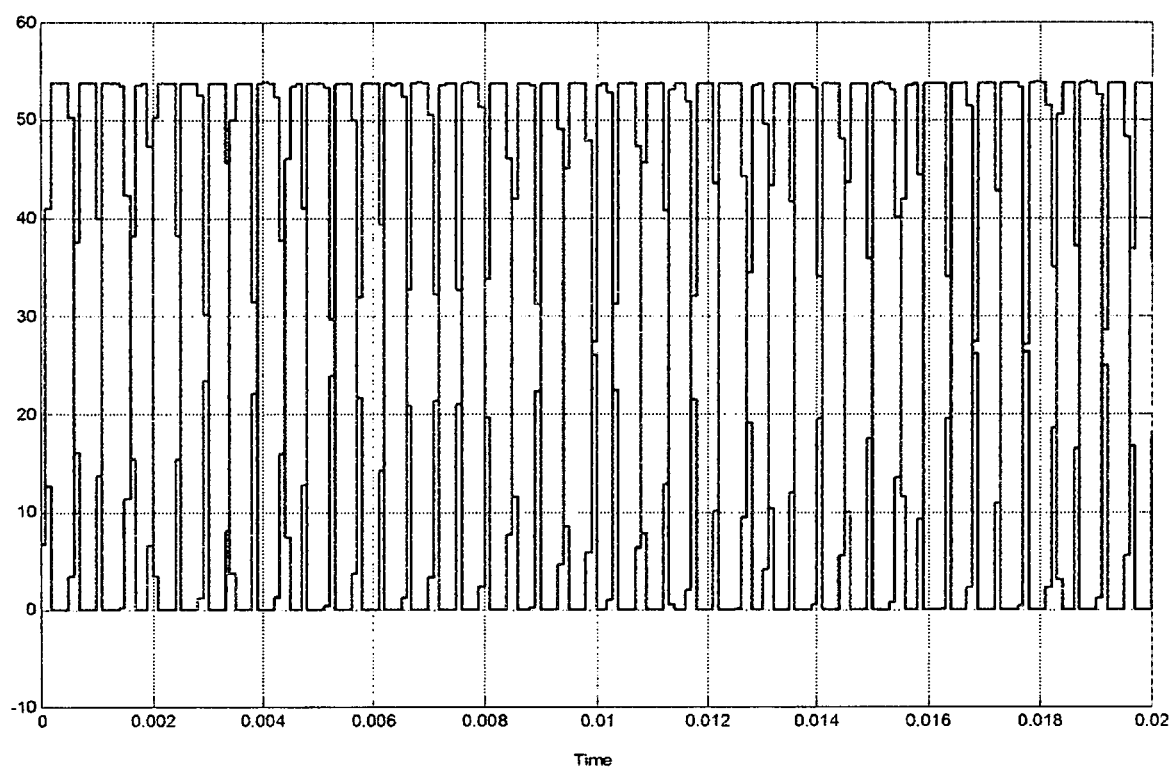

FIG. 9; displays diodes D1 and D2 current waveforms.

Figure 10:
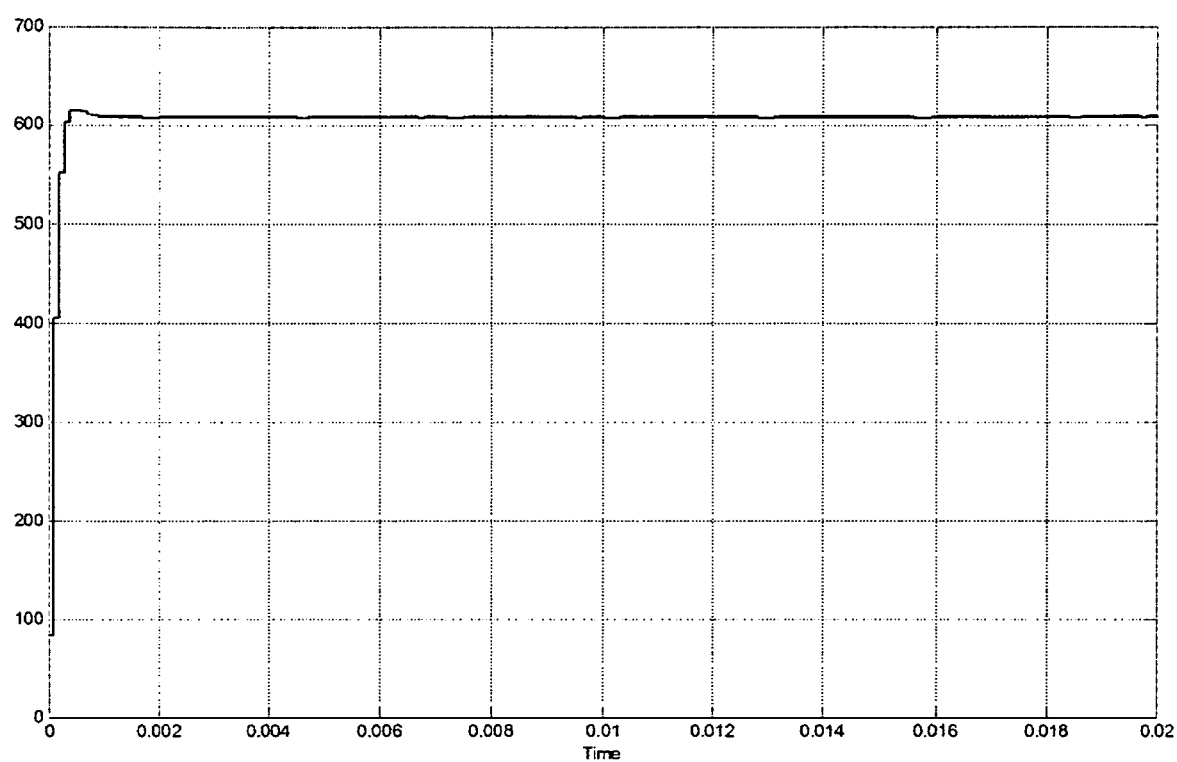

FIG. 10; displays a 72-pulse ac-dc converter output voltage.

Figure 11A:
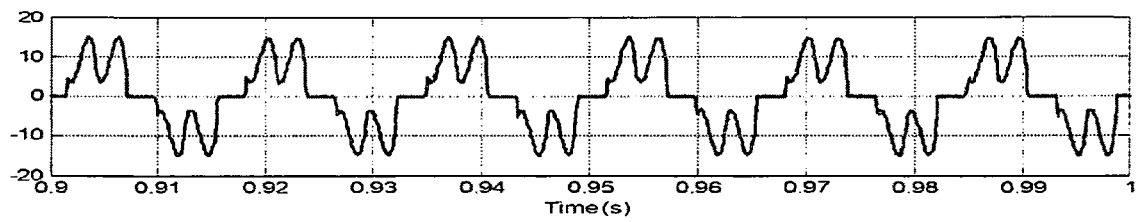
Figure 11A:
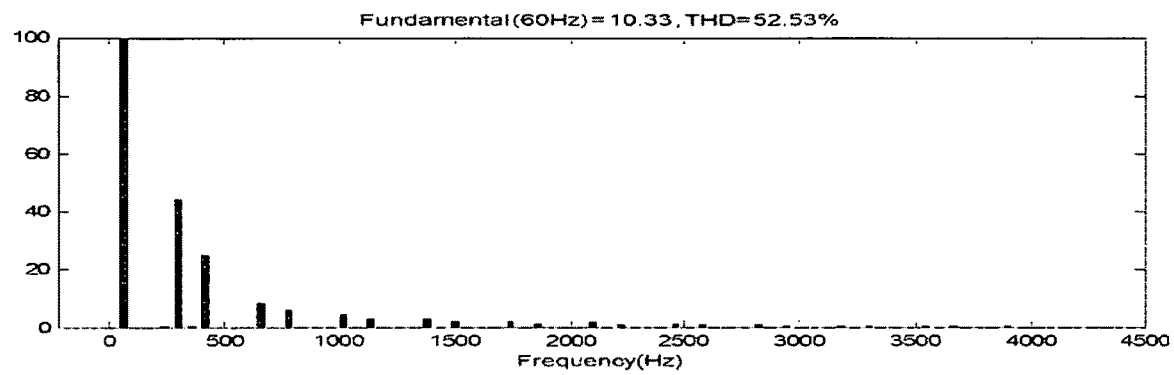
Figure 11B:
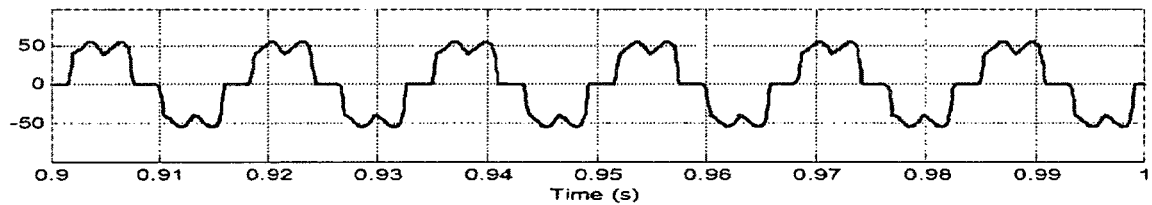
Figure 11B:
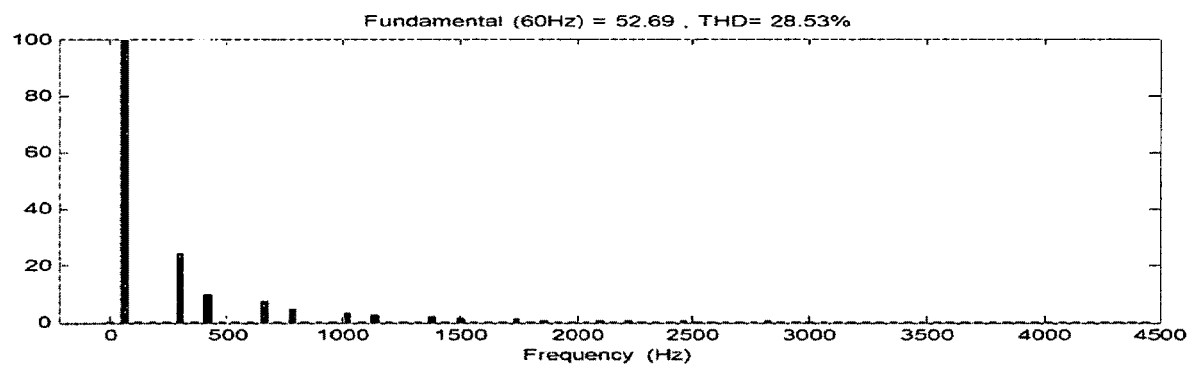

FIGS. 11A and B; displays an input current waveform and its harmonics spectrum of Six-pulse ac-dc converter under light (FIG. 11A) and full load (FIG. 11B).

Figure 12A:
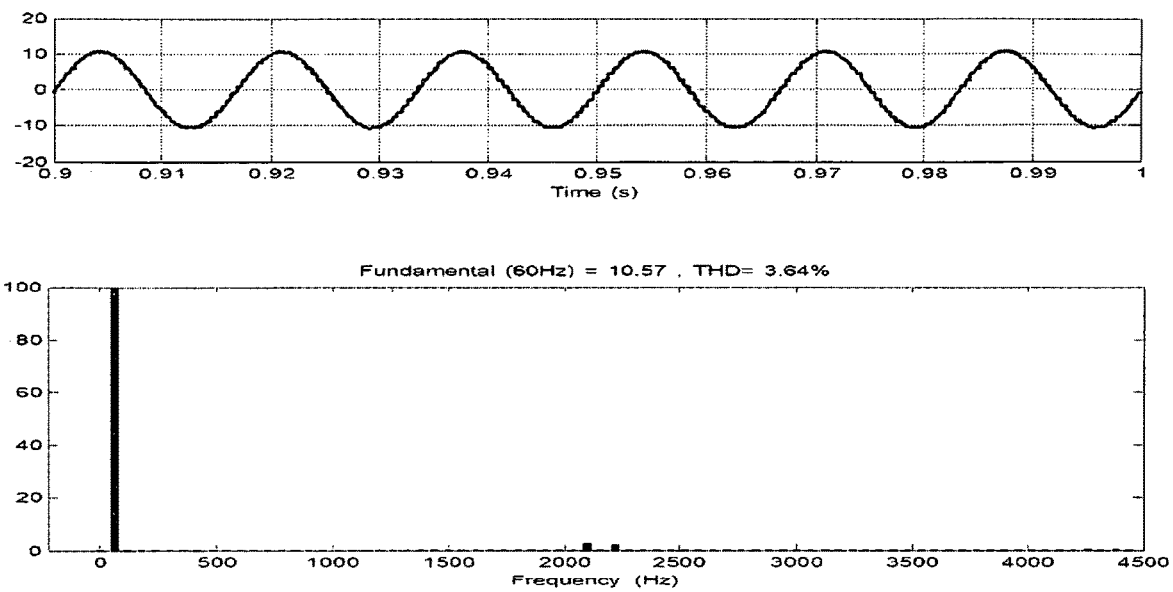
Figure 12B:
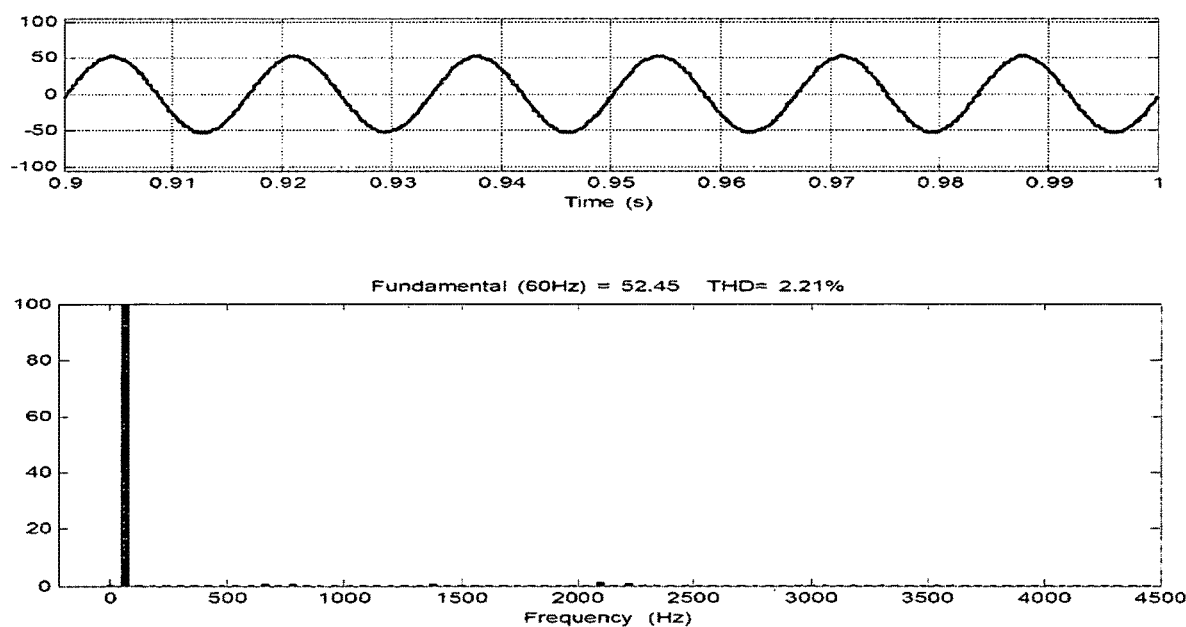

FIGS. 12A and 12B; displays an input current waveform and its harmonics spectrum of 36-pulse ac-dc converter under light (FIG. 12A) and full load (FIG. 12B).

Figure 13A:
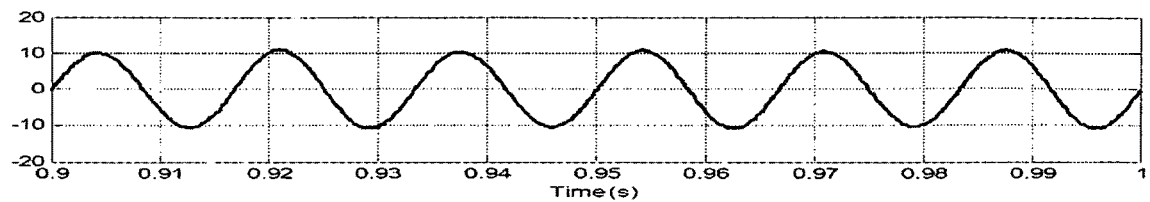
Figure 13A:
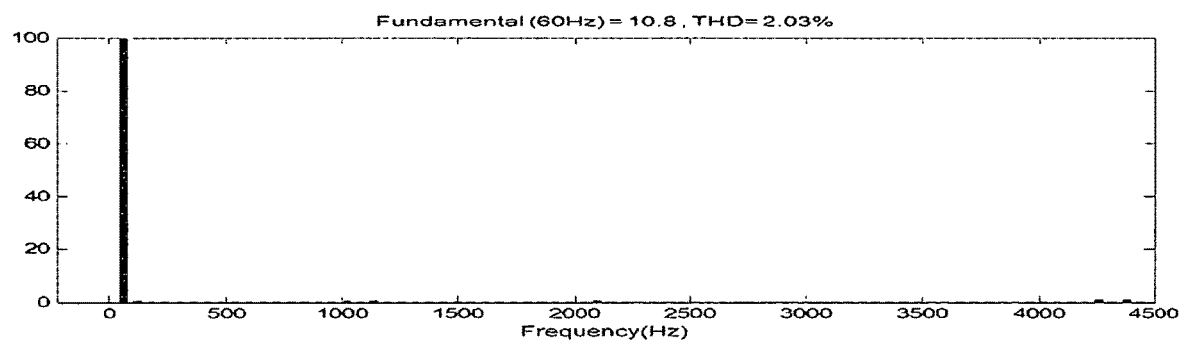
Figure 13B:
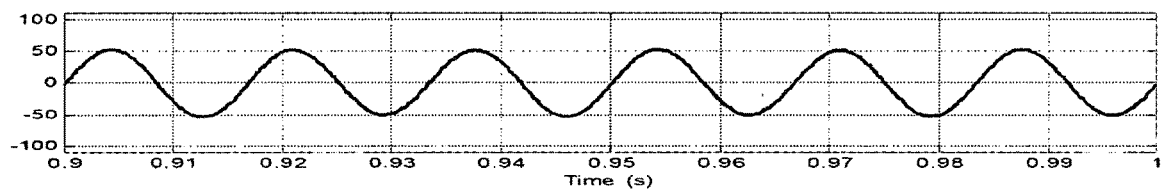
Figure 13B:
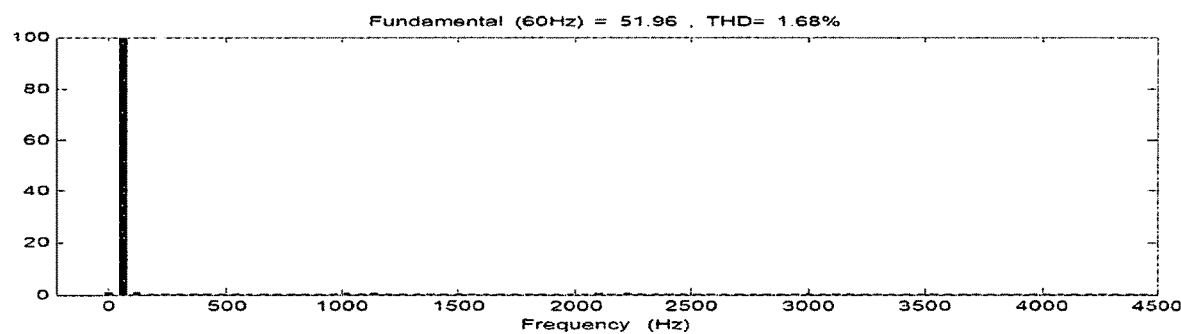

FIGS. 13A and 13B; displays an input current waveform and its harmonics spectrum of 72-pulse ac-dc converter under light (FIG. 13A) and full load (FIG. 13B).

OBJECT AND SUMMARY OF THE INVENTION

In order to overcome the above mentioned problems for the THD of the input currents in this invention, the design of a polygon-connected autotransformer based 36-pulse AC-DC converter is proposed. In the proposed structure, two nine-leg diode-bridge rectifiers are paralleled via an Inter-Phase Transformer (IPT) resulting in a 36-pulse output voltage. In order to double the number of pulses up to 72, a tapped IPT with two additional diodes are added to the rectifier outputs. The proposed converters are modeled and simulated using MATLAB software to study its behavior and specifically analyze the power quality indices. Finally, a low-rating laboratory prototype of the proposed 72-pulse converter is constructed in order to verify the simulation results and examine the effectiveness of the proposed topology.

Proposed 36-Pulse AC-DC Converter

It is well known that a 12-pulse rectified voltage can be made with two paralleled six-pulse three-phase (three-leg) diode-bridge rectifiers. The phase shift between the two supplying voltages should be 30 degrees. Similarly, in order to implement a 36-pulse ac-dc converter, two paralleled 18-pulse bridge rectifiers (two nine-leg rectifiers) are required.

In this case, two sets of nine-phase voltages with a phase difference of 40 degrees between the voltages of each group and 10 degrees difference between the same voltages of two groups are needed. For this purpose, a polygon-connected autotransformer is designed to produce the nine phase voltages. The phasor diagram of the proposed polygon-connected autotransformer with two sets of 9-phase voltages and the required angular displacement is illustrated in FIG. 1.

Design of Proposed Autotransformer for 36-Pulse AC-DC Converter:

The aforementioned two voltage sets as $V_{a1}$, $V_{a2}$, $V_{a3}$, $V_{a4}$, $V_{a5}$, $V_{a6}$, $V_{a7}$, $V_{a8}$, $V_{a9}$ and $V_{b1}$, $V_{b2}$, $V_{b3}$, $V_{b4}$, $V_{b5}$, $V_{b6}$, $V_{b7}$, $V_{b8}$, $V_{b9}$ are fed to rectifiers I and II, respectively. The similar voltages of two groups, i.e., $V_{a1}$ and $V_{b1}$, are displaced by 10 degrees. $V_{a1}$ and $V_{b1}$ have a phase shift of +5 and −5 degrees from the input voltage of phase A ($V_a$), respectively. The nine-phase voltages can be made from ac grid phase and line voltages using fractions of primary winding turns.

This is illustrated in FIG. 2 by 7 constants of $k_1$-$k_7$, representing the desired turn ratios correspond to each winding fraction. The derivation of these constant are given by the following equations.

$$V_A = V_s\angle 0°, \; V_B = V_s\angle -120°, \; V_C = V_s\angle 120°. \tag{1}$$

where, $V_s$ is the source phase voltage, $V_A$, $V_B$, and $V_C$ are three-phase primary winding voltages.

The two sets of nine-phase voltages with their phase shifts are given as follows:

$$V_{a1} = V_s\angle +5°, \; V_{a2} = V_s\angle -35°, \; V_{a3} = V_s\angle -75°,$$

$$V_{a4} = V_s\angle -115°, \; V_{a5} = V_s\angle -155°, \; V_{a6} = V_s\angle -195°,$$

$$V_{a7} = V_s\angle -235°, \; V_{a8} = V_s\angle -275°, \; V_{a9} = V_s\angle -315°. \tag{2}$$

$$V_{b1} = V_s\angle -5°, \; V_{b2} = V_s\angle -45°, \; V_{b3} = V_s\angle -85°,$$

$$V_{b4} = V_s\angle -125°, \; V_{b5} = V_s\angle -165°, \; V_{b6} = V_s\angle -205°,$$

$$V_{b7} = V_s\angle -245°, \; V_{b8} = V_s\angle -285°, \; V_{b9} = V_s\angle -325°. \tag{3}$$

Using the connection arrangement of the polygon-connected autotransformer shown in FIG. 2, the input voltages are written by (4) and (5) for converters I and II as follows:

$$V_{a1} = V_A + K_1 V_{CA} - K_2 V_{BC}$$

$$V_{a2} = V_{b1} - K_3 V_{AB} + K_4 V_{BC}$$

$$V_{a3} = V_{b2} - K_7 V_{AB}$$

$$V_{a4} = V_B + K_1 V_{AB} - K_2 V_{CA}$$

$$V_{a5} = V_{b4} - K_3 V_{BC} + K_4 V_{CA}$$

$$V_{a6} = V_{b5} - K_7 V_{BC}$$

$$V_{a7} = V_C + K_1 V_{BC} - K_2 V_{AB}$$

$$V_{a8} = V_{b7} - K_3 V_{CA} + K_4 V_{AB}$$

$$V_{a9} = V_{b8} - K_7 V_{CA} \tag{4}$$

$$V_{b1} = V_A - K_1 V_{AB} + K_2 V_{BC}$$

$$V_{b2} = V_{a2} - K_5 V_{AB} + K_6 V_{BC}$$

$$V_{b3} = V_{a3} + K_6 V_{CA} - K_5 V_{AB}$$

$$V_{b4} = V_B - K_1 V_{BC} + K_2 V_{CA}$$

$$V_{b5} = V_{a5} - K_5 V_{BC} + K_6 V_{CA}$$

$$V_{b6} = V_{a6} + K_6 V_{AB} - K_5 V_{BC}$$

$$V_{b7} = V_C - K_1 V_{CA} + K_2 V_{AB}$$

$$V_{b8} = V_{a8} - K_5 V_{CA} + K_6 V_{AB}$$

$$V_{b9} = V_{a9} + K_6 V_{BC} - K_5 V_{CA} \tag{5}$$

where, the line voltages are given as follows:

$$V_{AB} = \sqrt{3} V_A \angle 30°, \; V_{BC} = \sqrt{3} V_B \angle 30°, \; V_{CA} = \sqrt{3} V_C \angle 30°. \tag{6}$$

Constants $k_1$-$k_7$ are calculated based on (2)-(6) to determine the required windings turn numbers and achieve the desired phase shift for two voltage sets, as follows:

$$K_1 = 0.00254, \; K_2 = 0.04904, \; K_3 = 0.11802,$$

$$K_4 = 0.22183, \; K_5 = 0.0747, \; K_6 = 0.039747, \; K_7 = 0.29886. \tag{7}$$

The schematic diagram of the proposed 36-pulse ac-dc converter is shown in FIG. 3. Design of Autotransformer for Retrofit Applications:

Using instance, with the autotransformer of the proposed 36-pulse converter, the rectified output voltage is 17% higher than that of a six-pulse rectifier. For retrofit applications, the design procedure should be modified so that the dc-link voltage becomes equal to that of a six-pulse rectifier. This will be accomplished via modifications in the tapping positions of the windings as shown in FIG. 4. It should be noted that using this approach, the desired phase shift remains unchanged. Similar to section 2.1, the following equations can be written:

$$|V_S| = 0.8328 |V_A| \tag{8}$$

$$V_{a1} = V_A - K_1 V_{CA} + K_2 V_{BC}$$

$$V_{a2} = V_A - K_3 V_{AB} + K_4 V_{BC}$$

$$V_{a3} = V_B + K_5 V_{AB} - K_6 V_{CA}$$

$$V_{a4} = V_B + K_1 V_{AB} + K_2 V_{CA}$$

$$V_{a5} = V_B - K_3 V_{BC} + K_4 V_{CA}$$

$$V_{a6} = V_C + K_5 V_{BC} - K_6 V_{AB}$$

$$V_{a7} = V_C + K_1 V_{BC} + K_2 V_{AB}$$

$$V_{a8} = V_C - K_3 V_{CA} + K_4 V_{AB}$$

$$V_{a9} = V_A + K_5 V_{CA} - K_6 V_{BC} \tag{9}$$

$$V_{b1} = V_A - K_1 V_{AB} - K_2 V_{BC}$$

$$V_{b2} = V_A - K_5 V_{AB} + K_6 V_{BC}$$

$$V_{b3} = V_B + K_3 V_{AB} - K_4 V_{CA}$$

$$V_{b4} = V_B - K_1 V_{BC} - K_2 V_{CA}$$

$$V_{b5} = V_B - K_5 V_{BC} + K_6 V_{CA}$$

$$V_{b6} = V_C + K_3 V_{BC} - K_4 V_{AB}$$

$$V_{b7} = V_C - K_1 V_{CA} - K_2 V_{AB}$$

$$V_{b8} = V_C - K_5 V_{CA} + K_6 V_{AB}$$

$$V_{b9} = V_A + K_3 V_{CA} - K_4 V_{BC} \tag{10}$$

Accordingly, the values of constants $k_1$-$k_7$ are recalculated for retrofit applications as follows:

$$K_1 = 0.1136, \; K_2 = 0.01489, \; K_3 = 0.21188,$$

$$K_4 = 0.16985, \; K_5 = 0.27408, \; K_6 = 0.20295, \; K_7 = 0.24888. \tag{11}$$

Interphase Transformer:

A tapped IPT, as shown in FIG. 6, is used in this work to extract a 72-pulse current from the designed 36-pulse converter described in Section 2.1. For the pulse multiplication process, it is necessary to ensure that the average output voltages of bridges are equal and phase shifted by 10 degrees. As two 18-pulse rectifiers are paralleled, the voltage across the tapped IPT, $V_m$, has a frequency of 18 times of the supply. Therefore, the size, weight and volume of the tapped IPT will be reduced compared to rectifiers with less pulse number.

The $V_m$ is an alternating voltage with both positive and negative half cycles. Hence, $D_1$ conducts when $V_m$ is positive and, on the other hand, $D_2$ conducts when $V_m$ is negative. The MMF equivalence between the windings, when $D_1$ is on can be given as follows:

$$i_{dc1}N_A = i_{dc2}N_B \quad (12)$$

where, $N_A$ and $N_B$ are number of turns, as shown in FIG. 5. The output current of each rectifier is:

$$i_{dc1} + i_{dc2} = i_{dc} \quad (13)$$

Using (12) and (13), the output current of two rectifiers are calculated as follows:

$$i_{dc1} = (0.5 + K_t)i_{dc}$$

$$i_{dc2} = (0.5 - K_t)i_{dc} \quad (14)$$

In the above equation, $K_t = (N_B - 0.5N_t)/N_t$, where $N_t = N_A + N_B$. The same equation can be written, when $V_m$ is in its negative half cycle. Therefore, according to MMF equation, the magnitude of the output currents changes which, results in pulse multiplication in the supply current. It is proved that $K_t$ should be equal to 0.2457 to eliminate the harmonic currents up to the 37th order which can be applied in this application too.

Zero Sequence Blocking Transformer

In paralleled-rectifiers, two converters cannot be directly paralleled, as the output voltages are phase-shifted, and unwanted conduction of diodes is probable. Therefore, a ZSBT is required to ensure the independent operation of two paralleled rectifiers. In the proposed 72-pulse converter, the voltage frequency of ZSBT is nine times of the supply frequency and it shows high impedance at zero sequence (and its multiples) harmonic currents and therefore prevents their power flow. Furthermore, the high ripple frequency of the ZSBT voltage makes it small and light. An overall schematic of the proposed 72-pulse ac-dc converter is illustrated in FIG. 6.

Detailed Description of the Invention Simulations Results and Discussion

The designed configuration is simulated using Matlab/Simulink software and power system block set (PSB) toolbox. In these simulations, a three-phase, 460 V, 60 Hz network is utilized as the supply for the 36 and 72-pulse converters via the designed polygon-connected autotransformer, modeled by three multi-winding transformers. The multi-winding transformer block is also used for modeling the ZSBT and tapped IPT.

At the converter output (dc link), a series inductance (L) and a parallel capacitor (C) are connected to feed the IGBT-based Voltage Source Inverter (VSI). The VSI drives a squirrel cage induction motor employing vector-controlled strategy. The simulated induction motor is a 50 hp (37.3 kW), 4-pole, and Y-connected.

Motor and Controller Specifications:

Three-phase squirrel cage induction motor—50 hp (37.3 kW), three phase, four pole, Y-connected, 460 V, 60 Hz. $R_s = 0.0148\Omega$; $R_r = 0.0092\Omega$; $X_{ls} = 1.14\Omega$; $X_{lr} = 1.14\Omega$, $X_{Lm} = 3.94\Omega$, $J = 3.1$ Kg·m².

Controller parameters: PI controller Kp=300; Ki=2000.

DC link parameters: $L_d = 2$ mH; $C_d = 3200$ μF.

Source impedance: $Z_s = j0.1884\Omega$ (=3%).

The simulation results are depicted in FIGS. 7-13. FIG. 7 depicts two groups of nine-phase voltage waveforms with a phase shift of 10 degrees between the similar voltages of each group. The voltage across the tapped IPT is shown in FIG. 8, which has a frequency of 18 times of the supply frequency.

The diode D1 conducts when the voltage across the tapped IPT is positive and, vice versa the D2 is on, when the voltage across it is in its negative half-cycle. This conduction sequence of the diodes is the basis of the pulse doubling technique. The current waveforms of the pulse doubling diodes are shown in FIG. 9. The magneto-motive force (MMF) equivalence of the tapped IPT windings is presented using equation (14). The 72-pulse converter output voltage (shown in FIG. 10) is almost smooth and free of ripples with average value of 608.9 V, which is approximately equal to the DC link voltage of a six-pulse rectifier (607.9 V). This shows that the 72-pulse converter is a good candidate for retrofit applications.

The input current waveforms and its harmonics spectrum of the 6-pulse, 36-pulse, and 72-pulse converters extracted and shown in FIGS. 11-13, respectively, to check the requirements of standards. The harmonics spectra is obtained when induction motor operates under light load (20% of full load) and full load conditions. The input current THD of the typical 6-pulse converter is equal to 28.53% and 52.53% for full load and light load conditions, as illustrated in FIG. 11 respectively. As expected, these values are relatively large which are not within the standard margins. The presence of low order harmonics is also one of the drawbacks of these types of converters.

The current THD of the proposed 36-pulse converter is reduced to 2.21% and 3.64% for full load and light load conditions as shown in FIG. 12. This figure is still beyond the 3% limit set by IEEE standard. However, it can be seen that low order harmonics up to 33rd are significantly eliminated in the supply current due to the proper operation of the pulse multiplication. The application of the proposed 72-pulse converter results in an acceptable current THD of 2.03% for light load and 1.68% for full load conditions as shown in FIG. 13. In this configuration, low order harmonics up to 69th are further eliminated in the supply current.

TABLE I

COMPARISON OF SIMULATED POWER QUALITY PARAMETERS
OF THE VCIMD FED FROM DIFFERENT AC-DC CONVERTERS

| Sr. No. | Topology | % THD of $V_{ac}$ | AC Mains Current $I_{SA}$ (A) | | % THD of $I_{SA}$, at | | Distortion Factor, DF | | Displacement Factor, DPF | | Power Factor, PF | | DC Voltage (V) | |
|---|---|---|---|---|---|---|---|---|---|---|---|---|---|---|
| | | | Light Load | Full Load | Light Load | Full Load | Light Load | Full Load | Light Load | Full Load | Light Load | Full Load | Light Load | Full Load |
| 1 | 6-pulse | 5.64 | 10.33 | 52.69 | 52.53 | 28.53 | 0.8850 | 0.9599 | 0.9858 | 0.9881 | 0.8730 | 0.9485 | 616.6 | 607.6 |
| 2 | 36-pulse | 2.16 | 10.57 | 52.45 | 3.64 | 2.21 | 0.9993 | 0.9995 | 0.9992 | 0.9981 | 0.9985 | 0.9976 | 612.7 | 608.9 |
| 3 | 72-pulse | 1.70 | 10.8 | 51.96 | 2.03 | 1.68 | 0.9998 | 0.9997 | 0.9997 | 0.9997 | 0.9995 | 0.9993 | 611.1 | 608.9 |

In addition to the supply current THD, other power quality indices such as supply voltage THD, displacement power factor (DPF), distortion factor (DF), and power factor (PF) are also calculated under different loading conditions and listed in Table I. It can be seen that these indices are significantly improved. Moreover, the grid power factor for the 72-pulse topology, reaches unity PF from light to full load conditions.

The apparent power ratings of the polygon-connected autotransformer, tapped IPT, and ZSBT for 72-pulse configuration are calculated using the following equation:

$$S = 0.5 \Sigma V_{winding} I_{winding} \quad (15)$$

where, $V_{winding}$ is the rms voltage across the autotransformer, ZSBT and tapped IPT windings and $I_{winding}$ indicates the full load current of the same winding.

TABLE II

RMS VALUES OF THE VOLTAGE AND CURRENT FOR WINDINGS OF DIFFERENT
TRANSFORMERS AND THEIR VA RATING (EQ 15) FOR 7.5 KW LOAD

| Transformer | Rms values | W1 | W2 | W3 | W4 | W5 | W6 | W7 |
|---|---|---|---|---|---|---|---|---|
| $T_{AN}$ | $V_{rms}$ (V) | 43.16 | 80.51 | 104.15 | 104.15 | 80.51 | 43.16 | 77.12 |
| | $I_{rms}$ (A) | 2.403 | 2.287 | 2.398 | 2.274 | 2.486 | 2.269 | 2.268 |
| $T_{BC}$ | $V_{rms}$ (V) | 8 | 8 | 91.5 | 109.5 | 61.5 | 114.5 | 148 |
| | $I_{rms}$ (A) | 2.264 | 2.403 | 2.287 | 2.398 | 2.399 | 2.291 | 2.394 |
| $T_{CA}$ | $V_{rms}$ (V) | 61.5 | 109.5 | 91.5 | 8 | 8 | 91.5 | 109.5 |
| | $I_{rms}$ (A) | 2.264 | 2.274 | 2.486 | 2.269 | 2.399 | 2.291 | 2.394 |
| ZSBT | $V_{rms}$ (V) | 3.418 | 3.418 | 3.418 | 3.418 | | | |
| | $I_{rms}$ (A) | 4.789 | 5.102 | 4.778 | 5.134 | | | |
| IPT | $V_{rms}$ (V) | 1.177 | 2.349 | 1.177 | | | | |
| | $I_{rms}$ (A) | 4.826 | 2.035 | 5.073 | | | | |

| Transformer | Rms values | W8 | W9 | W10 | W11 | W12 | W13 | VA rating |
|---|---|---|---|---|---|---|---|---|
| $T_{AN}$ | $V_{rms}$ (V) | 64.54 | 5.65 | 5.65 | 64.54 | 77.12 | 380 | 1091.30 |
| | $I_{rms}$ (A) | 2.381 | 2.261 | 2.406 | 2.302 | 2.493 | 1.09 | |
| $T_{BC}$ | $V_{rms}$ (V) | 148 | 114.5 | 61.5 | 109.5 | 91.5 | 380 | 1082.32 |
| | $I_{rms}$ (A) | 2.268 | 2.381 | 2.261 | 2.270 | 2.379 | 1.09 | |
| $T_{CA}$ | $V_{rms}$ (V) | 61.5 | 114.5 | 148 | 148 | 114.5 | 380 | 1091.74 |
| | $I_{rms}$ (A) | 2.406 | 2.302 | 2.493 | 2.270 | 2.379 | 1.09 | |
| ZSBT | $V_{rms}$ (V) | | | | | | | 33.85 |
| | $I_{rms}$ (A) | | | | | | | |
| IPT | $V_{rms}$ (V) | | | | | | | 8.21 |
| | $I_{rms}$ (A) | | | | | | | |

These rms values are obtained from simulations with 10 hp (7.5 kW) load as tabulated in Table II. The calculated ratings are 3265.36 VA, 33.85 VA and 8.21 VA for autotransformer (TAN, TBC, and TCA), ZSBT and tapped IPR, respectively, which are 43.77%, 0.45% and 0.11% of the load power rating (7.5 kW), respectively. It means that the required magnetic ratings of the proposed topology is about 44.33% of the load rating while the current THD of less than 3% is achieved. This rating is less than many other topologies of ac-dc Converters. It can be seen that a total of 57.26% of magnetic rating is needed to achieve THDi <5% in a 40-pulse ac-dc converter.

In order to verify the design approach and demonstrate the applicability of the proposed topology, a laboratory prototype of conventional 6-pulse and the proposed 36-pulse and proposed 72-pulse converters are constructed. Several tests have been carried out using an equivalent resistive load under light load to demonstrate the worst case harmonic conditions. The input line current waveforms and their harmonics spectrum for 6-pulse, 36-pulse, and 72-pulse converters are determined using a HWT-1000 harmonic analyzer. It can be seen that there is a good agreement between theoretical and experimental results.

In this invention, a polygon-connected autotransformer was designed and modeled to make a 36-pulse ac-dc converter consisting of two paralleled 18-pulse nine-phase rectifiers. For retrofit applications, the proposed design procedure was modified. A zero-sequence-blocking transformer was added to ensure the independent operation of paralleled rectifiers and a tapped inter-phase transformer was used to double the number of pulses, resulting in decreasing the size and volume of the transformers as well as improvement of the power quality indices at the PCC.

In addition, a laboratory prototype was constructed to show the applicability of the proposed topology. The simulation and experimental results demonstrate the proper operation of the proposed configuration and its good agreement with the limits set by IEEE-519. In summary, the power quality improvement of the supply current/voltage and reduced ratings of the transformers, and consequently reduced cost of the converter, are the major benefits of the proposed 72-pulse ac-dc converter.

What I claim is:

1. A polygon-connected autotransformer based 72-pulse ac-dc converter for Power Quality Improvement, comprising: a 36-pulse ac-dc topology, comprising two parallel 18-pulse ac-dc converters, wherein each one of said 18-pulse ac-dc converters comprise a nine-phase (nine-leg) diode bridge rectifier;

wherein a zero sequence blocking transformer (ZBST) operates said bridge diode rectifiers independently; and wherein an average voltage output of said bridges are equal and phase shifted by 10 degrees;

wherein a tapped inter phase transformer is located at an output of said ZBST, wherein said tapped transformer doubles voltage pulses of said output of ZBST to 72.

2. The autotransformer of claim 1, wherein a voltage frequency of said ZBST is nine times higher than of a supply frequency and wherein said ZBST comprises high impedance at zero sequence and multiple harmonics currents.

3. The autotransformer of claim 2, wherein said output of ZBST is smooth and ripple free with average voltage value of 608.9 V, which is approximately equal to a DC link voltage of a six pulse rectifier, therefore said autotransformer is suitable for retrofit applications.

4. The autotransformer of claim 3, wherein an apparent power ratings of said autotransformer, said tapped inter-phase transformer and said ZSBT are calculated using the following equation: $S=\Sigma V_{winding}I_{winding}$; wherein $V_{winding}$ is an rms voltage across said autotransformer, said ZSBT and said tapped IPT windings and $I_{winding}$ indicates a full load current of a same winding.

5. The autotransformer of claim 4, wherein said rms voltage are obtained from simulations with 10 hp (7.5 KW) load, and wherein calculated ratings are 3265.36 VA, 33.85 VA and 8.21 VA for said autotransformer, said ZSBT and said tapped inter-phase transformer respectively, and wherein said calculated ratings are 43.77%, 0.45% and 0.11% of the load power rating of (7.5 KW) respectively.

6. The autotransformer of claim 5, wherein said topology is a 36-pulse converter and wherein use of pulse doubling technique with a low rating; 2% of said load power results in increased number of pulses to 72.

7. The autotransformer of claim 6, wherein said autotransformer comprises retrofit applications replacing 6-pulse converters with common applications requiring improved power quality indices at a mains (input current THD of less that) 3% in most loading conditions.

* * * * *